(12) United States Patent
Kitabayashi

(10) Patent No.: US 7,137,705 B2
(45) Date of Patent: Nov. 21, 2006

(54) OPTICAL DEVICE WITH OPTICAL MODULATOR FIXATION-ENHANCING STRUCTURE AND PROJECTOR

(75) Inventor: Masashi Kitabayashi, Horigane-mura (JP)

(73) Assignee: Seiko Epson Corporation, Tokyo (JP)

( * ) Notice: Subject to any disclaimer, the term of this patent is extended or adjusted under 35 U.S.C. 154(b) by 170 days.

(21) Appl. No.: 10/923,843

(22) Filed: Aug. 24, 2004

(65) Prior Publication Data

US 2005/0083589 A1 Apr. 21, 2005

(30) Foreign Application Priority Data

Aug. 26, 2003 (JP) ............... 2003-301288

(51) Int. Cl.
| | | |
|---|---|---|
| G03B 21/00 | (2006.01) | |
| G02F 1/03 | (2006.01) | |
| G02F 1/1333 | (2006.01) | |
| G02B 26/00 | (2006.01) | |
| G02B 27/14 | (2006.01) | |
| G02B 7/00 | (2006.01) | |
| H04N 9/07 | (2006.01) | |

(52) U.S. Cl. ................. 353/31; 353/33; 353/81; 353/122; 359/237; 359/244; 359/496; 359/638; 359/503; 359/892; 349/58; 348/338

(58) Field of Classification Search .............. 353/31, 353/33, 81, 122; 359/237, 490, 244, 496, 359/299, 638, 503, 892; 349/58; 348/338–339
See application file for complete search history.

(56) References Cited

U.S. PATENT DOCUMENTS 5,978,054 A * 11/1999 Fujimori .................. 349/60
6,536,906 B1 * 3/2003 Fujimori et al. ............. 353/119
6,619,800 B1 * 9/2003 Takezawa et al. ............ 353/20
6,639,743 B1 * 10/2003 Watanabe .................... 359/820
6,882,480 B1 * 4/2005 Yanagisawa ................. 359/634
6,935,745 B1 * 8/2005 Kitabayashi et al. .......... 353/20

FOREIGN PATENT DOCUMENTS

| JP | A-8-22074 | 1/1996 |
|---|---|---|
| JP | A-8-194201 | 7/1996 |
| JP | A-11-202411 | 7/1999 |
| JP | A-2000-221588 | 8/2000 |
| JP | A-2001-100185 | 4/2001 |
| JP | A-2002-182308 | 6/2002 |

\* cited by examiner

*Primary Examiner*—W. B. Perkey
*Assistant Examiner*—Magda Cruz
(74) *Attorney, Agent, or Firm*—Oliff & Berridge, PLC

(57) ABSTRACT

A cross dichroic prism as a color-combining optical device and optical modulators constituting an optical device body are fixed with insulating pins being interposed. The optical device body includes a base and reinforcing members, supporting surfaces for supporting and fixing the reinforcing members are formed at a heat conductive member constituting the base. The reinforcing members are supported by the supporting surfaces of the heat conductive member, and also support and fix the optical modulators so as to enhance fixing state of the optical modulators relative to the cross dichroic prism.

With this arrangement, an optical device as well as a projector, in which the connecting state of the optical modulators relative to the color-combining optical device can be strengthened so as to form a fine optical image without pixel deviation, can be provided.

14 Claims, 9 Drawing Sheets

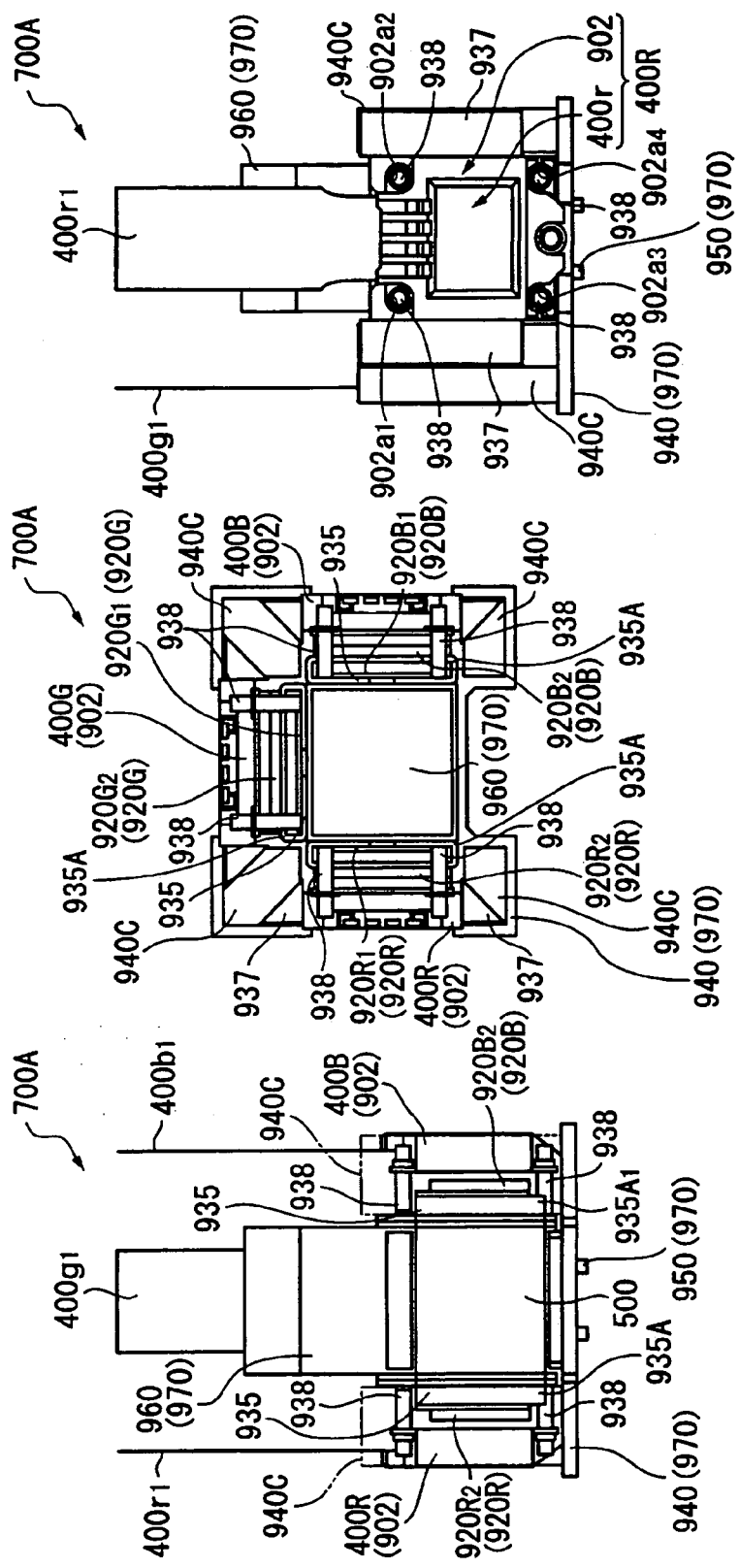

OPTICAL DEVICE WITH OPTICAL MODULATOR FIXATION-ENHANCING STRUCTURE AND PROJECTOR

TECHNICAL FIELD

The present invention relates to an optical device and a projector.

BACKGROUND ART

Conventionally, there has been known a three-plate type projector including a color-separating optical system that separates a light beam irradiated by a light source into three color lights, three optical modulators that modulate the respective color lights in accordance with image information, and a color-combining optical device that combines the light beam modulated by the respective optical modulators.

In order to downsize the projector, an optical device in which three optical modulators are bonded and fixed relative to a color-combining optical device is applied to such a three-plate type projector (for example, see JP2000-221588A).

In this optical device, the three optical modulators are bonded and fixed relative to the color-combining optical device with a plurality of pin spacers being interposed.

To be more specific, each of the optical modulators includes an optical modulation element for modulating a light, and a holder frame having an opening corresponding to an image formation area of the optical modulation element and housing the optical modulation element. Here, four holes are formed on a periphery of the opening of the holder frame. While housing and holding the optical modulation element in the holder frame, by respectively inserting four pin spacers to the four holes formed on the holder frame, end surfaces of the respective pin spacers are bonded and fixed on a light-incident surface of the color-combining optical device, and also outer surfaces of the respective pin spacers are bonded and fixed on inner surfaces of the respective holes, so that the three optical modulators are bonded and fixed relative to the color-combining optical device.

DISCLOSURE OF THE INVENTION

However, in the optical device described in Patent Document 1, since the optical modulator is supported and fixed by the plurality of pin spacers relative to the color-combining optical device, an external force against the optical device may cause each of the spacers to be inclined, and inclination of the pin spacer may further cause displacement of the optical modulator relative to the color-combining optical device. Owing to this, the position of the plurality of optical modulators may mutually be displaced, thereby resulting in pixel deviation on a projection image.

An object of the present invention is to provide an optical device as well as a projector, in which connecting state of the optical modulators relative to the color-combining optical device can be strengthened so as to form a fine optical image without pixel deviation.

An optical modulator according to an aspect of the present invention includes: a plurality of optical modulators that respectively modulate a plurality of color lights in accordance with image information; a color-combining optical device that combines and irradiates the respective color lights modulated by the optical modulators; a plurality of fixing members that respectively fix the plurality of optical modulators relative to respective light-incident surfaces of the color-combining optical device; a base fixed on at least one of a pair of end surfaces crossing to the respective light-incident surfaces of the color-combining optical device; and a plurality of reinforcing members disposed on lateral end surfaces of the plurality of optical modulators in a facing manner, in which supporting surfaces that support the plurality of reinforcing members are formed on the base, and the plurality of reinforcing members are supported by the supporting faces, and also support and fix the respective lateral end surfaces of the plurality of optical modulators, so that fixing state of the plurality of optical modulators is enhanced relative to the respective light-incident surfaces of the color-combining optical device.

For example, the present invention is applicable to the optical device in which the plurality of optical modulators are respectively fixed to the light-incident surfaces of the color-combining optical device with a plurality of pin spacers being interposed as the fixing members. On the other hand, the present invention is also applicable to the optical device in which the plurality of optical modulators are respectively fixed to the light-incident surfaces of the color-combining optical device by other components as the fixing members without limiting to the plurality of pin spacers.

The state that the plurality of optical modulators are respectively fixed to the light-incident surfaces of the color-combining optical device may include such a configuration that the plurality of optical modulators are fixed to components respectively fixed on the light-incident surfaces of the color-combining optical device, other than the configuration that the plurality of optical modulators are directly fixed on the light-incident surfaces of the color-combining optical device with the fixing members such as the pin spacers being interposed.

Further, the lateral end surfaces of the optical modulators can be supported and fixed directly by the reinforcing members, or can be supported and fixed with components for holding the optical modulators being interposed.

In the present invention, the supporting surfaces for supporting the plurality of reinforcing members are formed on the base, the plurality of reinforcing members being supported by the supporting surfaces, and also respectively supporting and fixing the lateral end surfaces of the plurality of optical modulators. Accordingly, the connecting state of the plurality of optical modulators and the color-combining optical device can be strengthened with the use of the fixing members such as the pin spacers. Therefore, even when the external force is applied to the optical device, the displacement of the positions of the optical modulators relative to the color-combining optical device can be avoided, the positions of the plurality of optical modulators can precisely be maintained with each other, and a fine optical image can be formed without pixel deviation.

Additionally, since the supporting surfaces are formed on the base, the supporting and fixing state of the lateral end surfaces of the optical modulators by the reinforcing members can appropriately be maintained. On this account, even when the optical modulators are used for a long period, the supporting and fixing state of the lateral end surfaces of the optical modulators can be remained fine state.

Preferably, in the optical device of the present invention, the base may include a plate component rectangular in plan view and legs extending from four corners of the plate component to be parallel to a plate surface of the plate component, a column projecting in an out-plane direction of the leg may be provided on each of the legs, and an end of the column may have a step to have the supporting surface for supporting the reinforcing member.

In the present invention, the base includes the plate component and the legs, each of the legs being provided with the column. The step is formed at the end of the column to define the supporting surface for supporting the reinforcing member. Owing to this, for instance, if it is so configured that the reinforcing member is supported by the supporting surface of the column, the reinforcing member supports and fixes the lateral end surface of the optical modulator, and the reinforcing member is fixed on the stepped lateral surface of the column, the supporting and fixing state of the lateral end surface of the optical modulator can further be enhanced by the reinforcing member.

Preferably, in the optical device of the present invention, the supporting surface may be widened toward a light-incident side, and the reinforcing member may be formed in a substantially triangle pole, an end of the pole being supported by the supporting surface, and one of three external lateral surfaces of the substantially triangle pole supporting and fixing the lateral end surface of the optical modulator while another external lateral surface abutting on the column.

According to the present invention, since the supporting surface is widened toward the light-incident side, and the reinforcing member is formed substantially in a triangle pole, the reinforcing members can easily be placed between the column and the lateral end surface of the optical modulator from the light-incident side, thereby easily manufacturing the optical device.

Further, the end of the pole of the reinforcing member is supported by the supporting surface, one of the external lateral surfaces supports and fixes the lateral end surface of the optical modulator, and another external lateral surface abuts on the column. Then, for instance, a light curing adhesive or a heat curing adhesive is applied between the end of the pole and the supporting surface, between one of the external lateral surfaces and the lateral end surface of the optical modulator, and between the another external lateral surface and the column. If the position of the optical modulator is adjusted while the adhesive being uncured, the reinforcing member follows the movement of the optical modulator due to the surface tension of the adhesive, so that the optical modulator can easily be fixed after the position thereof is adjusted, and besides, the fixing state of the optical modulator relative to the color-combining optical device can be enhanced.

Preferably, in the optical device of the present invention, the base may include a plate component rectangular in plan view, and legs extending from four corners of the plate component to be parallel to a plate surface of the plate component and having the supporting surfaces that support the reinforcing members, and the reinforcing member may be configured by a columnar component having a substantially trapezoidal cross section, an end of the columnar component being supported by the supporting surface, and at least one of external lateral surfaces thereof, which respectively include two sides facing but not being parallel to each other constituting the trapezoidal cross section, supporting and fixing the lateral end surface of the optical modulator.

According to the arrangement of the present invention, the leg of the base is defined as the supporting surface of the reinforcing member. Further, the end of the column component of the reinforcing member is supported by the supporting surface, and at least one of the external lateral surfaces respectively including the two sides facing but not being parallel to each other constituting the substantially trapezoidal cross section supports and fixes the lateral end surface of the optical modulator. Accordingly, the reinforcing member disposed between the adjacent optical modulators can supports and fixes the respective lateral end surfaces of the adjacent optical modulators with each other by the external lateral surfaces respectively including the two sides facing but not being parallel to each other constituting the substantially trapezoidal cross section, so that the least number of the reinforcing members can strengthen the connecting state of the plurality of optical modulators relative to the color-combining optical device.

For instance, the light curing adhesive or the heat curing adhesive is applied between the end of the columnar component and the leg, and between at least one of the external lateral surfaces respectively including the two sides facing but not being parallel to each other constituting the substantially trapezoidal cross section and the lateral end surface of the optical modulator. If the position of the optical modulator is adjusted while the adhesive being uncured, the reinforcing member follows the movement of the optical modulator due to the surface tension of the adhesive, so that the optical modulator can easily be fixed after the position thereof is adjusted, and besides, the fixing state of the optical modulator relative to the color-combining optical device can be enhanced.

Preferably, in the optical device of the present invention, the base may include a plate component rectangular in plan view and legs extending from four corners of the plate component to be parallel to a plate surface of the plate component and having the supporting surfaces that support the reinforcing members, and the reinforcing member configured by a rectangular plate component with facing edges being processed by bending may include a base portion substantially located at the center and two extended portions extending from the base portion so as to have a truncated chevron cross section, an end of the reinforcing member crossing to the facing edges being supported by the supporting surface, and at least one of the two extended portions thereof supporting and fixing the lateral end surface of the optical modulator.

According to the arrangement of the present invention, the leg of the base is defined as the supporting surface of the reinforcing member. Further, the end of the reinforcing member crossing to the facing edges thereof is supported by the supporting surface, and at least one of the two extended portions thereof supports and fixes the lateral end surface of the optical modulator. Accordingly, the reinforcing member disposed between the adjacent optical modulators can supports and fixes the respective lateral end surfaces of the adjacent optical modulators with each other by the two extended portions, so that the least number of the reinforcing members can strengthen the connecting state of the plurality of optical modulators relative to the color-combining optical device.

Since the reinforcing member can be formed by a rectangular plate by bending, the reinforcing member can easily be manufactured, and consequently, the production cost of the optical device can be reduced.

For instance, the light curing adhesive or the heat curing adhesive is applied between the end crossing to the facing edges and the leg, and between at least one of the extended portions and the lateral end surface of the optical modulator. If the position of the optical modulator is adjusted while the adhesive being uncured, the reinforcing member follows the movement of the optical modulator due to the surface tension of the adhesive, so that the optical modulator can easily be fixed after the position thereof is adjusted, and besides, the fixing state of the optical modulator relative to the color-combining optical device can be enhanced.

Preferably, in the optical device of the present invention, the plate component may have the thickness greater than that of the leg to form a stepped portion at a part connecting with the leg, and an external lateral surface of the reinforcing member including a short side out of two sides being parallel to each other constituting the substantially trapezoidal cross section or the base portion thereof may abut on the stepped portion.

In the present invention, the stepped portion is formed on the plate component, the external lateral surface of the reinforcing member including the short side out of the two sides being parallel to each other constituting the substantially trapezoidal cross section or the base portion of the reinforcing member abutting on the stepped portion. Accordingly, for instance, when the abutting part is fixed by the adhesive or the like, the connecting state of the plurality of optical modulators relative to the color-combining optical device by the reinforcing members can further be strengthened.

Preferably, in the optical device of the present invention, the optical modulator may include an optical modulation element for modulating a light and a holder frame in which the optical modulation element is housed, and the holder frame, the reinforcing member and the base may be made of heat conductive material, the respective components being bonded and fixed to each other by a heat conductive adhesive.

According to the arrangement of the present invention, since the holder frame, the reinforcing member and the base constituting the optical modulator are made of heat conductive material, and they are bonded and fixed by the heat conductive adhesive, the rigidity of the optical device can be enforced, the heat conductivity between the respective components can be enhanced, and further, the heat deterioration of the optical modulation element can be inhibited by radiating the heat generated at the optical modulation element constituting the optical modulator due to irradiation of the light beam to the holder frame, the reinforcing member and the base.

A projector according to another aspect of the present invention includes: a light source; a color-separating optical device that separates a light beam irradiated by the light source into a plurality of color lights; the above-described optical device; and a projection optical device that projects an optical image formed by the optical device in an enlarged manner.

With this arrangement, since the projector includes the above-descried optical device, the same effects and advantages as the above-described optical device can be obtained.

Additionally, since the projector includes the optical device, the rigidity of which is enhanced, the projection optical device can constantly projects a vivid image.

BRIEF DESCRIPTION OF DRAWINGS

FIG. 2 is an illustration showing an optical device body of the aforesaid embodiment;

BEST MODE FOR CARRYING OUT THE INVENTION

1. First Embodiment

A first embodiment of the present invention will be described below with reference to the attached drawings.

[1-1 Configuration of Projector]

Figure 1:
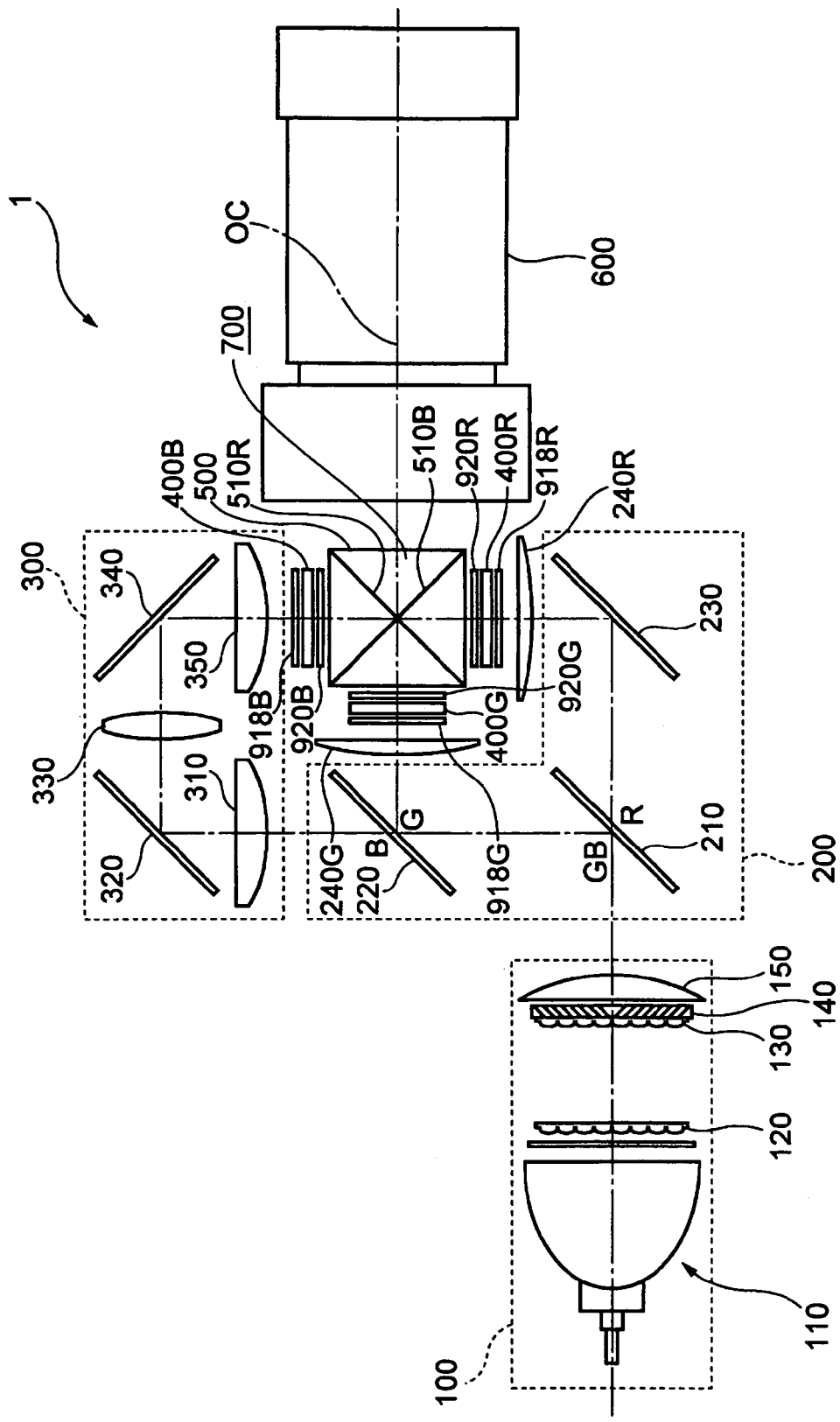
FIG. 1 is a schematic illustration showing an optical system of a projector provided with an optical device according to a first embodiment.

FIG. 1 is a schematic illustration showing an optical system of a projector 1 provided with an optical device according to the first embodiment.

The projector 1 modulates a light beam irradiated by a light source in accordance with image information and projects the light beam on a projection surface such as a screen in an enlarged manner. As shown in FIG. 1, the projector 1 includes an illuminating optical system 100, a color-separating optical system 200 as a color-separating optical device, a relay optical system 300, an optical device 700, which has three optical modulators 400R, 400G and 400B and a cross dichroic prism 500 as a color-combining optical system, and a projection optical system 600 as a projection optical device. These optical components 100 to 300, 400R, 400G, 400B, 500 and 600 are housed in an unshown casing for optical components.

The illuminating optical system 100 is an optical system for equalizing illuminance of the light beam irradiated by the light source on a plane orthogonal to an illumination optical axis. As shown in FIG. 1, the illuminating optical system 100 has a light source 110, a first lens array 120, a second lens array 130, a polarization converter 140 and a superposing lens 150.

Though not specifically shown, the light source 110 is constituted of a light source lamp as a radial light source and a reflector. The radial light beam irradiated by the light source lamp is reflected by the reflector to be a substantially parallel light beam and is irradiated toward the outside. For example, a high-pressure mercury lamp, a metal halide lamp or a halogen lamp may be applied to the light source lamp. Besides, for example, a parabolic mirror or an ellipsoidal mirror may be applied to the reflector. When using the ellipsoidal mirror, such a configuration will be taken that a parallelizing concave lens is disposed on an irradiation-side of the reflector.

The first lens array 120 has small lenses arranged in a matrix, the lenses having substantially rectangular profile seen in an illumination optical axis direction. The respective small lenses separate the light beam irradiated by the light source 110 into sub-beams and emit the sub-beams in the illumination optical axis direction.

The second lens array 130 is arranged approximately in the same manner as the first lens array 120, which includes small lenses arranged in a matrix. The second lens array 130 focuses image of the small lenses of the first lens array 120 onto image formation areas of three optical modulators 400R, 400G and 400B together with the superposing lens 150.

The polarization converter 140 converts the light beam irradiated from the second lens array 130 into substantially uniform straight polarized light, thereby enhancing the light utilization efficiency of the optical device 700.

Specifically, the respective sub-beams converted into the substantially uniform straight polarized light by the polarization converter 140 are substantially superposed on the image formation areas of the optical modulators 400R, 400G and 400B by the superposing lens 150 finally. Since only one-type of polarized light can be used in a projector using liquid crystal panels that modulate a polarized light, approximately half of the light beam from the light source 110 emitting random polarized light cannot be used. Accordingly, with the use of the polarization converter 140, the light beam irradiated by the light source 110 is converted into substantially uniform polarized light to enhance the light utilization efficiency of the optical modulators 400R, 400G and 400B. Incidentally, such polarization converter 140 is disclosed in, for instance, JP Hei08-304739A.

The color-separating optical system 200 has two dichroic mirrors 210 and 220, and a reflection mirror 230. The plurality of sub-beams irradiated by the illuminating optical system 100 are separated into three-color lights of red (R), green (G) and blue (B) by the two dichroic mirrors 210 and 220.

The relay optical system 300 has an incident-side lens 310, a relay lens 330, reflection mirrors 320 and 340, and a field lens 350. The relay optical system 300 guides the color light (blue light) separated by the color-separating optical system 200 toward the optical modulator 400B for blue light.

At this time, the dichroic mirror 210 of the color-separating optical system 200 reflects the green light component and blue light component of the light beam irradiated by the illuminating optical system 100 and transmits the red light component. The red light transmitted by the dichroic mirror 210 is reflected by the reflection mirror 230, and reaches to the optical modulator 400R for red light through a field lens 240R. The field lens 240R converts the respective sub-beams irradiated by the second lens array 120 into a light beam parallel to the central axis (main beam) thereof. Other field lenses 240G and 350 respectively provided on the light-incident sides of the optical modulator 400G for green light and the optical modulator 400B for blue light function in the same manner as described above.

In the blue and green lights reflected by the dichroic mirror 210, the green light is reflected by the dichroic mirror 220, and reaches to the optical modulator 400G for green light through the field lens 240G. On the other hand, the blue light is transmitted through the dichroic mirror 220, passed through the relay optical system 300, and reaches to the optical modulator 400B for blue light.

Incidentally, the relay optical system 300 is used for the blue light in order to avoid deterioration in the light utilization efficiency on account of light dispersion and the like caused by the longer length of the optical path of the blue light than the optical path of other color light. In other words, the relay optical system 300 is used for directly transmitting the sub-beams incident on the incident-side lens 310 to the field lens 350. Incidentally, though the blue light of the three-color lights passes through the relay optical system 300, the red light, for instance, may alternatively pass through the relay optical system 23.

The optical device 700 modulates the incident light beam in accordance with image information to form a color image. The optical device 700 includes three incident-side polarization plates 918R, 918G and 918B to which the color lights separated by the color-separating optical system 200 respectively enter, the optical modulators 400R, 400G and 400B as well as the irradiation-side polarization plates 920R, 920G and 920B disposed on the downstream of these incident-side polarization plates 918R, 918G and 918B, and the cross dichroic prism 500. Among these components, the optical modulators 400R, 400G and 400B, and the cross dichroic prism 500 are integrated to constitute an optical device body 700A (see FIG. 2).

The incident-side polarization plate 918R, 918G and 918B are disposed at the furthermost position on the most light-incident side of the optical device body 700A, and have such a configuration that a polarization film is attached on a substrate for only transmitting the polarized light of a predetermined direction out of the color lights passing through the color-separating optical system 200, and for absorbing other light beam. Though the incident-side polarization plates 918R, 918G and 918B are separated from the optical device body 700A, they may integrally be provided with the optical device body 700A on the light-incident side thereof.

Incidentally, the detailed structure of the optical device body 700A will be described below.

The projection optical system 600 is disposed on the irradiation-side of the optical device 700. It is configured to display a color image formed by the optical device 700 as a display image on a screen (projection surface) in an enlarged manner.

[1-2. Configuration of Optical Device Body]

FIG. 2 is an illustration showing the optical device body 700A. To be more specific, FIG. 2(*a*) is a front elevational view of the optical device body 700A, FIG. 2(*b*) is a plan view of the optical device body 700A, and FIG. 2(*c*) is a side elevational view of the optical device body 700A.

As shown in FIG. 2, the optical device body 700A includes the optical modulators 400R, 400G and 400B; insulating pins 938 as fixing members; a cross dichroic prism 500 (FIG. 2(*a*)); the irradiation-side polarization plates 920R, 920G and 920B (FIG. 2(*a*), FIG. 2(*b*)); three heat conducting plates 935 (FIG. 2(*a*), FIG. 2(*b*)); bases 970; and six reinforcing members 937 (FIG. 2(*b*), FIG. 2(*c*)). As shown in FIG. 2, the optical device body 700A is constituted of these optical components 400R, 400G, 400B, 500, 920R, 920G, 920B, 937, 938 and 970 by integrating as a unit.

The optical modulators 400R, 400G and 400B are, for instance, formed by three transmissive optical modulators, which are disposed on the light-incident sides of the cross dichroic prism 500 so as to respectively correspond to the color lights of R, G and B.

Because the optical modulators 400R, 400G and 400B have the substantially same configurations, description on the optical modulators 400G and 400B will be omitted, but only the optical modulator 400R will be described. As shown in FIG. 2(*c*), the optical modulator 400R mainly consists of a liquid crystal panel 400*r* and a panel holder frame 902.

It is to be noted that the same or equivalent (i.e., different only in characters of r, g and b) reference numerals as the optical modulator 400R will be attached to the components such as a flexible substrate connected and linked to each of the optical modulators 400G and 400B for describing the components.

The liquid crystal panel 400r has two glass substrates (not shown) facing with each other with a liquid crystal layer (not shown) being interposed, and is connected to a flexible substrate 400r1 for wiring. The color lights respectively incident on the light-incident sides are converted into color signals (image signals) corresponding to the respective color lights, and the converted lights are irradiated as transmitted lights.

As shown in FIG. 2, the panel holder frame 902 is attached to the light-incident surface of the cross dichroic prism 500 by four insulating pins 938 to house and hold the liquid crystal panel 400r therein. The panel holder frame 902 is entirely formed by a high heat conductive member of aluminum alloy or the like. Pin inserting holes 902a1 to 902a4 to which the four insulating pins 938 are respectively inserted are provided at corners of the panel holder frame 902.

The irradiation-side polarization plates 920R, 920G and 920B have the substantially same functions as the incident-side polarization plates 918R, 918G and 918B, i.e., the irradiation-side polarization plates 920R, 920G and 920B each transmitting the polarized light in a predetermined direction and absorbing other light beam. As shown in FIG. 2(*a*) or FIG. 2(*b*), these irradiation-side polarization plates 920R, 920G and 920B respectively include first irradiation-side polarization plates 920R1, 920G1 and 920B1 attached to the light-incident surface of the cross dichroic prism 500, and second irradiation-side polarization plates 920R2, 920G2 and 920B2 supported and fixed on the heat conducting plates 935.

The first irradiation-side polarization plates 920R1, 920G1 and 920B1, and the second irradiation-side polarization plates 920R2, 920G2 and 920B2 are configured to have different characteristics in light absorption with the respective polarization axes being parallel to each other. Since each of the irradiation-side polarization plates 920R, 920G and 920B has two components as described above, heat to be absorbed by the irradiation-side polarization plates 920R, 920B and 920B can be divided proportionally between the two components, thus inhibiting heat deterioration of the irradiation-side polarization plates 920R, 920G and 920B, compared to the case of configuring with one component.

The first irradiation-side polarization plates 920R1, 920G1 and 920B1, and the second irradiation-side polarization plates 920R2, 920G2 and 920B2 are arranged such that the polarization axes are parallel to each other and substantially orthogonal to the polarization axes of the incident-side polarization plates 918R, 918G and 918B.

The heat conducting plate 935 is formed in a substantially rectangular profile by sheet metal processing of an aluminum plate. Opening (not shown), to which each of the first irradiation-side polarization plates 920R1, 920G1 and 920B1 attached to the cross dichroic prism 500 can be fitted, is formed at the substantially center in plane view of the heat conducting plates 935, and besides, a projected portion 935A (FIG. 2(*a*), FIG. 2(*b*)) having substantially an L-shaped cross section and projecting toward the light-incident side are formed at left and right edges of the heat conducting plate 935. The heat conducting plates 935 support and hold the second irradiation-side polarization plates 920R2, 920G2 and 920B2 by the projected portions 935A, and heat-conductively connect to the first irradiation-side polarization plates 920R1, 920G1 and 920B1 attached to the cross dichroic prism 500, so that upper and lower ends of the heat conducting plates 935 are fixed on the lateral side of the base 970 with heat conductive elastic members (not shown) being interposed.

The heat conducting plate 935 may be made of electrically galvanized sheet iron other than aluminum, made of synthetic resin formed by molding such as injection molding, or made by a product of iron-nickel alloy such as Invar, magnesium alloy, aluminum alloy or the like.

As shown in FIG. 2, the insulating pin 938 has a substantially columnar profile, which is made of synthetic resin (acrylic material) transmitting ultraviolet rays. The insulating pins 938 are inserted to the pin inserting holes 902a1 to 902a4 of the panel holder frames 902 of the optical modulators 400R, 400G and 400B, and ends thereof are fixed on light-incident surfaces of the heat conducting plates 935, so that the optical modulators 400R, 400G and 400B are supported and fixed on the heat conducting plates 935.

The insulating pin 938 may be made of other synthetic resin transmitting ultraviolet rays other than acrylic material, or alternatively, may be made of optical glass, crystal, sapphire, quartz, fluorite or the like. Further, the number of the insulating pins 938 is not limited to four, but may be any number as long as more than one. In this case, the number of pin inserting holes 902a1 to 902a4 will correspond to the number of the insulating pins 938 of the panel holder frame 902 for each of the optical modulators 400R, 400G and 400B.

The cross dichroic prism 500 combines the optical image irradiated by the irradiation-side polarization plates 920R, 920G and 920B and modulated for each color light to form a color image. In the cross dichroic prism 500, a dielectric multi-layer film 510R (FIG. 1) for reflecting the red light and a dielectric multi-layer film 510B (FIG. 1) for reflecting the blue light are formed along the boundaries of four right-angle prisms approximately in X-shape, the dielectric multi-layer films 510R and 510B combining the three color lights.

The bases 970 are fixed on an upper surface and a lower surface (a pair of end surfaces orthogonal to the light-incident surfaces) of the cross dichroic prism 500. As shown in FIG. 2, the bases 970 include a substantially rectangular parallelepiped upper base 960 fixed on the upper surface of the cross dichroic prism 500, a prism fixing plate 950 for supporting and fixing the lower surface of the cross dichroic prism 500, and a heat conductive member 940 connected to the prism fixing plate 950 for entirely supporting and fixing the optical device body 700A.

Figure 3A:
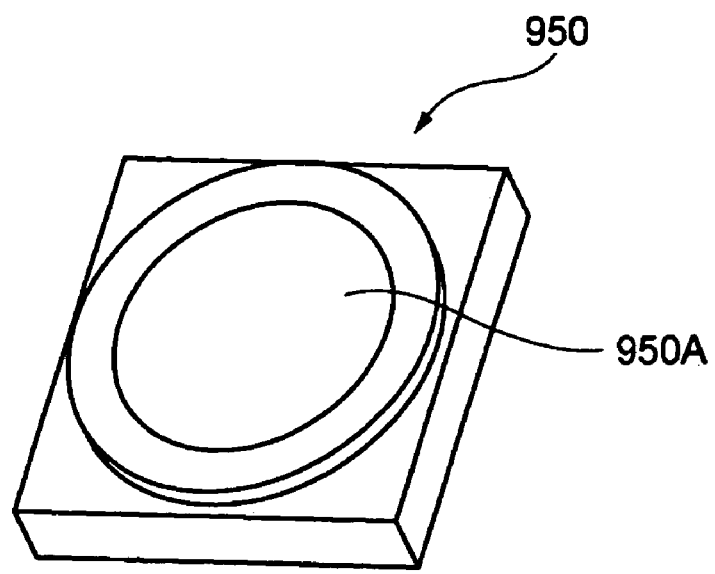
FIG. 3 is an illustration showing a prism fixing plate of the aforesaid embodiment.
Figure 3B:
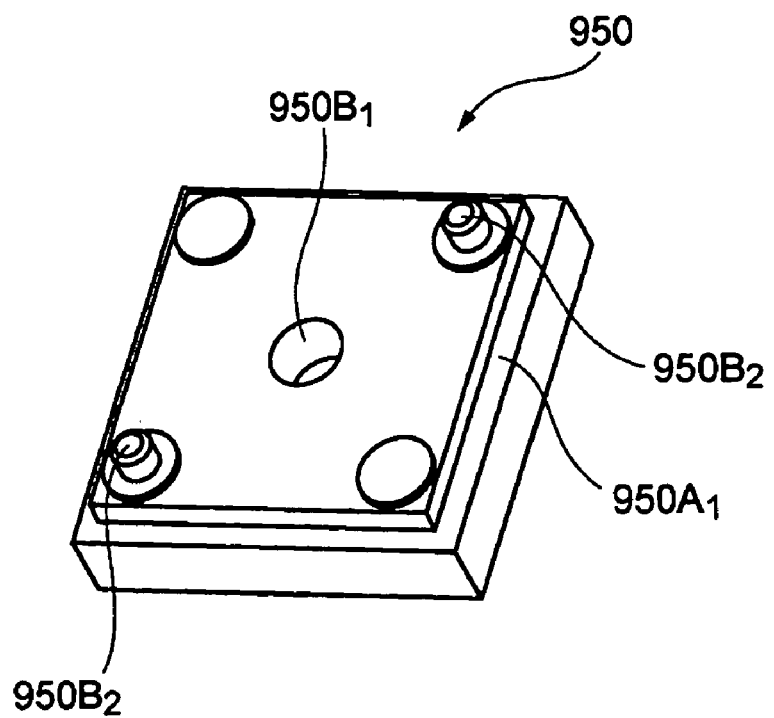
Figure 4A:
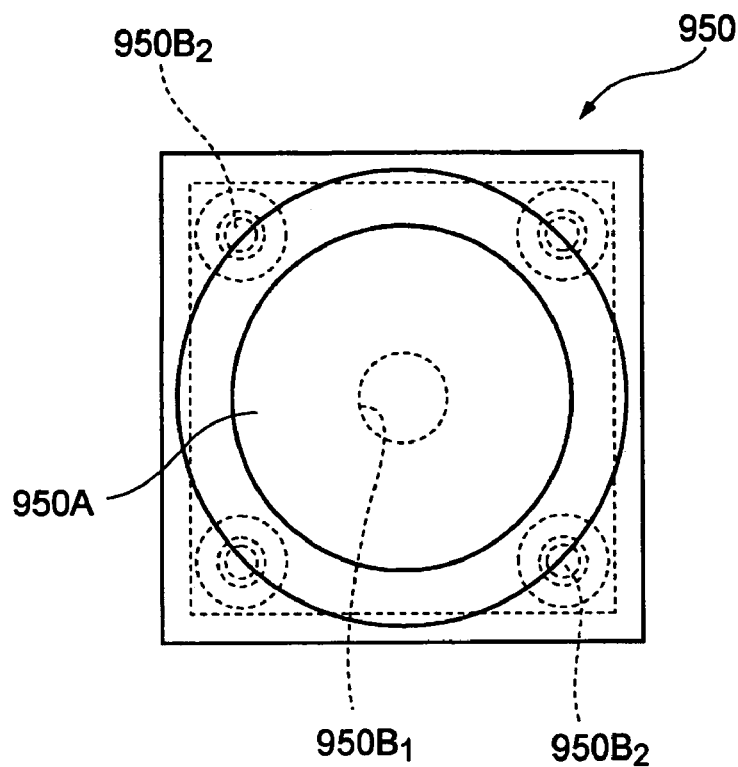
FIG. 4 is an illustration showing the prism fixing plate of the aforesaid embodiment.
Figure 4B:
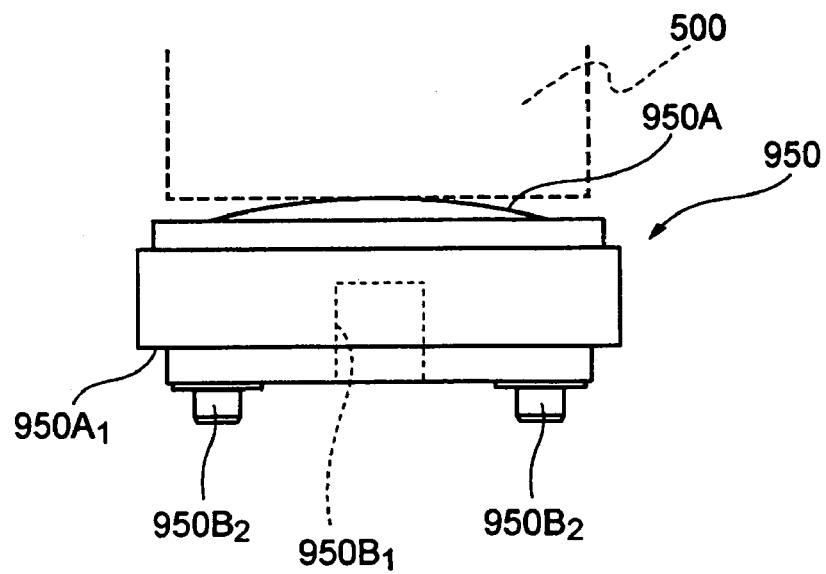

FIGS. 3 and 4 are illustrations each showing the prism fixing plate 950. More specifically, FIG. 3(*a*) is a perspective view showing an upper side of the prism fixing plate 950, and FIG. 3(*b*) is a perspective view showing a lower side of the prism fixing plate 950. Besides, FIG. 4(*a*) is a plan view showing the upper side of the prism fixing plate 950, and FIG. 4(*b*) is an illustration showing a lateral side of the prism fixing plate 950.

As shown in FIGS. 3 and 4, the prism fixing plate 950 has a stepped surface 950A1 (FIG. 3(*b*), FIG. 4(*b*)) to be abutted on a stepped surface of the below-described heat conductive member 940, the stepped surface 950A1 being fitted to a frame of the heat conductive member 940. A projected portion 950A projecting upward is formed on an upper end surface of the prism fixing plate 950. Accordingly, the position of the cross dichroic prism 500 is adjusted and attached on the upper end surface of the prism fixing plate 950. A screw hole 950B1 for attaching the prism fixing plate 950 to the unshown casing for optical components is provided substantially at the center of a lower end surface of the prism fixing plate 950. Additionally, projections 950B2 projected downward for positioning the prism fixing plate 950 are provided at corners of the lower end surface of the prism fixing plate 950.

Figure 5:
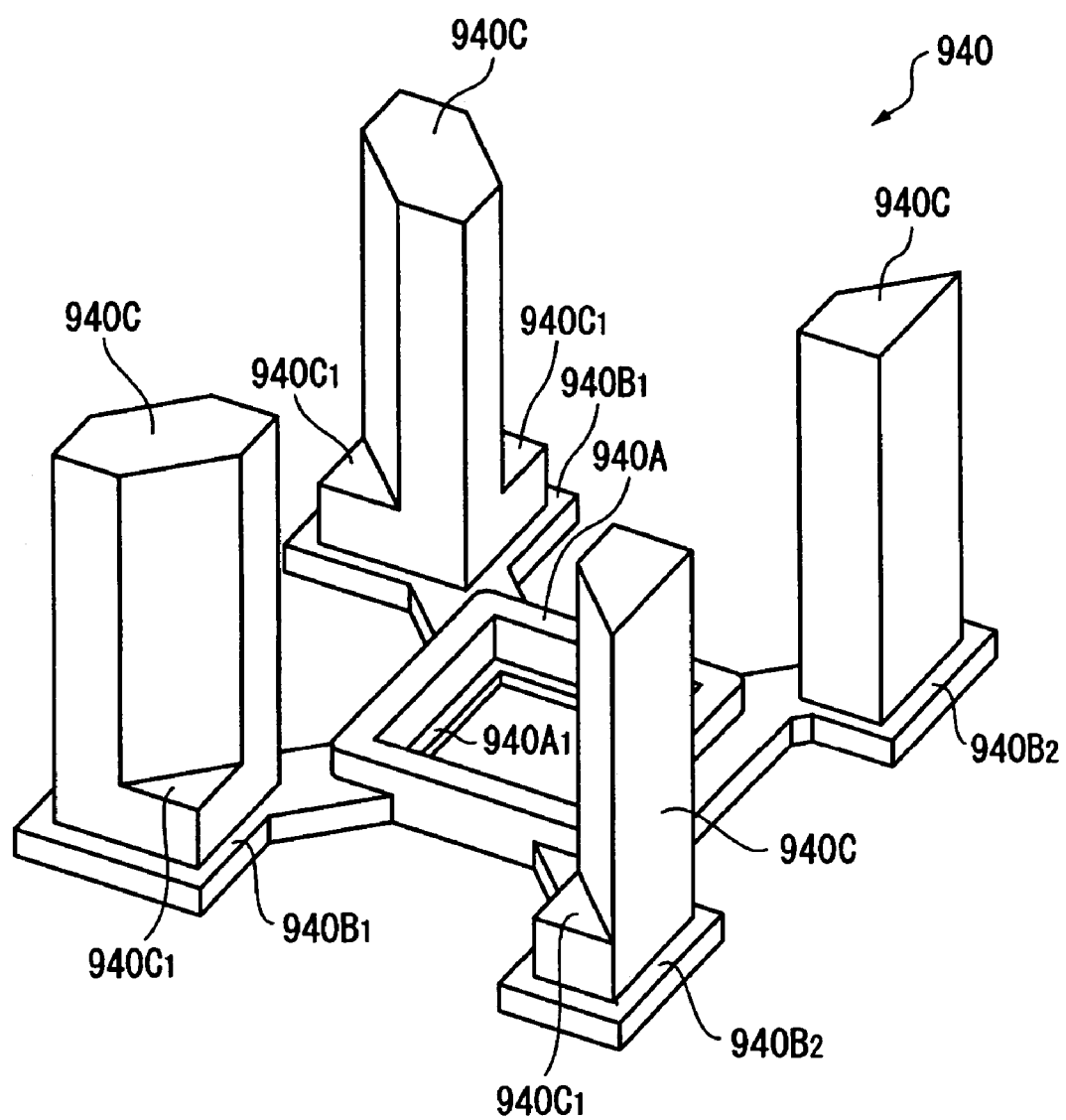
FIG. 5 is an illustration showing a heat conductive member of the aforesaid embodiment.
Figure 6A:
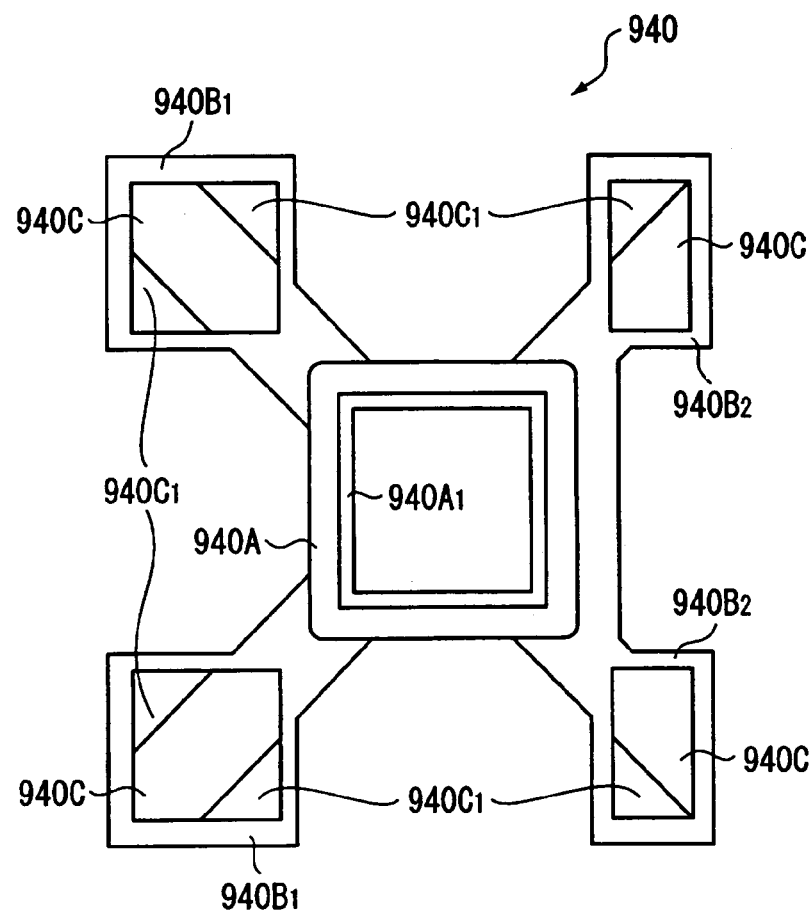
FIG. 6 is an illustration showing the heat conductive member of the aforesaid embodiment.
Figure 6B:
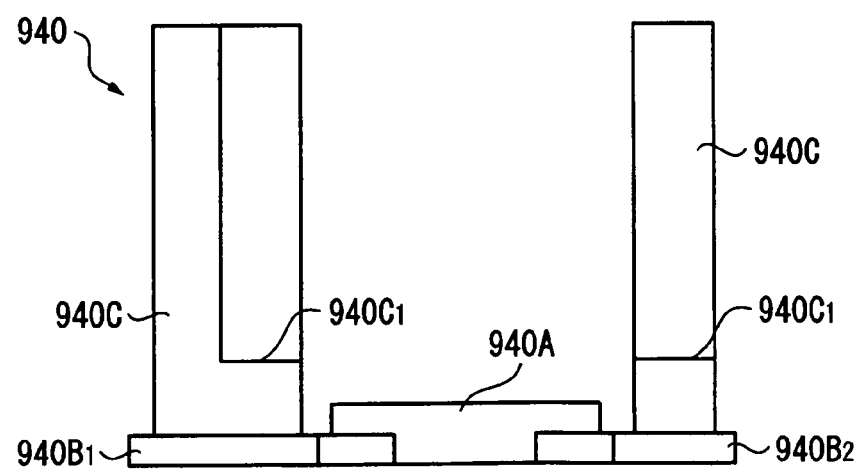

FIGS. 5 and 6 are illustrations each showing the heat conductive member 940. More specifically, FIG. 5 is a perspective view showing the heat conductive member 940 seen from the above. FIG. 6(*a*) is a plan view showing the heat conductive member 940, and FIG. 6(*b*) is a side elevational view showing the heat conductive member 940.

As shown in FIGS. 5 and 6, the heat conductive member 940 includes a rectangular frame 940A opening in a vertical direction and two pairs of legs 940B1 and 940B2 linking to the frame 940A.

The frame 940A has a stepped surface 940A1 therein to mount the prism fixing plate 950 on the stepped surface 940A1 by the stepped surface 950A1 of the prism fixing plate 950 abutting on the stepped surface 940A1.

Note that, the frame 940A corresponds to a plate component of the present invention.

Each of the legs 940B1 and 940B2 has a supporting surface for supporting the reinforcing member 937.

Four columns 940C projecting upward are formed on upper surfaces of the legs 940B1 and 940B2.

Each of the columns 940C is formed in a substantially square pole to extend along left and right edges of each of the panel holder frames 902 of the optical modulators 400R, 400G and 400B as the optical device body 700A is assembled.

At an end of the column 940C, there is a step at a corner facing to a lateral end surface of the panel holder frame 902, the step defining a supporting surface 940C1 that supports the reinforcing member 937. The supporting surface 940C1 is widened toward the light-incident side.

The above-described base 970 is made of aluminum alloy. However, the material of the base 970 is not limited to aluminum alloy. For example, the base 970 may be made of metal such as aluminum, magnesium, titanium or the alloy of these, iron-nickel alloy such as Invar or 42Ni—Fe, carbon steel, brass or stainless steel; or resin (polycarbonate, PolyPhenylene Sulfide, liquid crystal resin or the like) with carbon filler such as carbon fiber or carbon nanotube being mixed, since such a material is lightweight and has good heat conductivity.

The reinforcing member 937 is a triangle spacer made of aluminum alloy formed in a triangle pole substantially having a right triangle cross section. The reinforcing member 937 is supported by the supporting surface 940C1 of the column 940C of the heat conductive member 940 such that a lateral surface including hypotenuse constituting the substantially right triangle cross section faces to a lateral surface of the column 940C while another lateral surface including another side constituting the substantially right triangle cross section faces to the lateral end surface of the panel holder frame 902. An ultraviolet curing adhesive is applied to the reinforcing member 937, the supporting surface 940C1 of the column 940C, the lateral surface of the column 940C and the lateral end surface of the panel holder frame 902, and consequently, the panel holder frame 902 is fixed to the column 940C by the reinforcing member 937 in a heat conductive manner.

Incidentally, the material of the reinforcing member 937 is not limited to aluminum alloy. For example, the reinforcing member 937 may be made of metal such as aluminum, magnesium, titanium or the alloy of these, iron-nickel alloy such as Invar or 42Ni—Fe, carbon steel, brass or stainless; or resin (polycarbonate, PolyPhenylene Sulfide, liquid crystal resin or the like) with carbon filler such as carbon fiber or carbon nanotube being mixed, since such a material is lightweight and has good heat conductivity, or still alternatively, may be made of heat conductive rubber member.

[1-3. Manufacturing Method of Optical Device Body]

Next, a manufacturing method of the above-described optical device body 700A will be described with reference to attached drawings.

Figure 7:
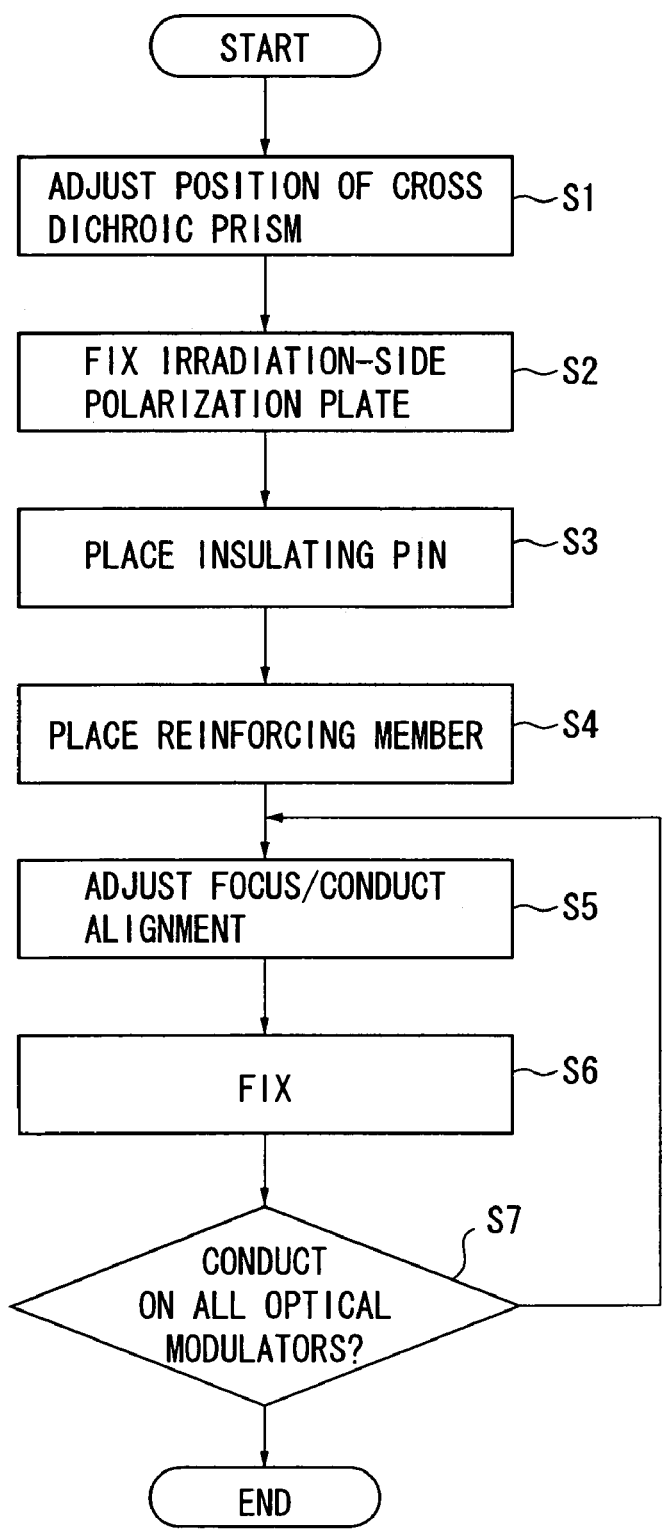
FIG. 7 is a flowchart explaining a manufacturing method of the optical device body of the aforesaid embodiment.

FIG. 7 is a flowchart explaining the manufacturing method of the optical device body 700A.

It is assumed that the liquid crystal panels are respectively fixed inside the panel holder frames 902.

First, the cross dichroic prism 500 is fixed on the prism fixing plate 950 attached on the heat conductive member 940 (step S1).

To be more specific, the heat conductive member 940 with the prism fixing plate 950 being attached is placed at a predetermined position, and the ultraviolet curing adhesive is applied to the projected portion 950A of the prism fixing plate 950. With the use of a prism position adjuster (not shown), the cross dichroic prism 500 is placed on the projected portion 950A to which the adhesive is applied. Further, by using the prism position adjuster (not shown), the position of the cross dichroic prism 500 is adjusted. For instance, it may be available that white laser is irradiated on the three light-incident surfaces of the cross dichroic prism 500, so that the position of the cross dichroic prism 500 is adjusted relative to the prism fixing plate 950 based on the light beam irradiated from the light-irradiation surface thereof. For another instance, it also may be available that the upper surface's image of the cross dichroic prism 500 is picked up, so that the position of the cross dichroic prism 500 is adjusted relative to the prism fixing plate 950 based on the picked image of the upper surface of the cross dichroic prism 500. After the position is adjusted, ultraviolet rays are irradiated on the ultraviolet curing adhesive filled between the lower surface of the cross dichroic prism 500 and the projected portion 950A of the prism fixing plate 950 to cure the adhesive.

After the processing of step S1, the irradiation-side polarization plates 920R, 920G and 920B are fixed relative to the cross dichroic prism 500 (step S2).

More specifically, the first irradiation-side polarization plates 920R1, 920G1 and 920B1 are bonded and fixed to predetermined positions on the light-incident surfaces of the cross dichroic prism 500. Besides, the upper base 960 of the base 970 is bonded and fixed on the upper surface of the cross dichroic prism 500. Further, the heat conducting plates 935 supporting and fixing the second irradiation-side polarization plates 920R2, 920G2 and 920B2 are arranged such that the first irradiation-side polarization plates 920R1, 920G1 and 920B1 are fitted to the openings (not shown) of the heat conducting plates 935, and bonded and fixed on the lateral surfaces of the base 970 with the heat conductive elastic members being interposed.

After the processing of step S2, the optical modulators 400R, 400G and 400B as well as the insulating pins 938 are placed relative to the unit integrated in step S2 (step S3).

Specifically, the ultraviolet curing adhesive is applied to both ends of the insulating pins 938 on the light-incident side and the light-irradiation side thereof (i.e., adhered portion). The insulating pins 938 are then inserted to the pin inserting holes 902*a*1 to 902*a*4 of the panel holder frame 902 from the light-incident side of the panel holder frame 902, so that the ends of the insulating pins 938 on the light-irradiation side thereof are abutted on the light-incident surface of the heat conducting plate 935. When the insulating pins 938 are abutted on the light-incident surfaces of the heat conducting plates 935, the insulating pins 938 are interposed between the heat conducting plates 935 and the optical modulators 400R, 400G and 400B.

The reinforcing member 937 is then placed relative to the unit integrated in step S3 (step S4).

More specifically, the ultraviolet curing adhesive is applied to the end of the reinforcing member 937 on one side, the lateral surface including hypotenuse constituting the substantially right triangle cross section, and the lateral surface including the another side constituting the substantially right triangle cross section. The end of the reinforcing member 937 on one side is mounted on the supporting surface 940C1 of the column 940C of the heat conductive member 940 in the state that the respective lateral surfaces with the adhesive applied face to the lateral surface of the column 940C and to the lateral end surface of the panel holder frame 902. The reinforcing member 937 is then pressed toward the light-irradiation side from the light-incident side, so that the lateral surface including hypotenuse constituting the substantially right triangle cross section of the reinforcing member 937 and the lateral surface including the another side constituting the substantially right triangle cross section are abutted on the lateral surface of the column 940C and the lateral end surface of the panel holder frame 902. In this instance, the ultraviolet curing adhesive applied between the column 940C and the panel holder frame 902 is stayed uncured.

Next, the focus adjustment and alignment of the optical modulators 400R, 400G and 400B are conducted (step S5).

Describing specifically on the optical modulator 400G anterior to the projection optical system 600 (FIG. 1), alignment is conducted according to a connecting surface between the light-incident surface of the heat conducting plate 935 and the insulating pins 938 as a sliding surface, and besides, focus is adjusted according to a connecting surface between the outer surfaces of the insulating pins 938 and the inner surfaces of the pin inserting holes 902a1 to 902a4 of the panel holder frame 902 as a sliding surface, that is, the focus is adjusted by sliding the optical modulator 400G relative to the insulating pins 938. Note that, when assuming an optical axis direction of the projection optical system 600 as a Z direction and two axes orthogonal to the optical axis direction as X and Y-axes, the alignment indicates adjustment in an X-axial direction, a Y-axial direction and a rotation direction (θ direction) on an XY plane. The focus adjustment indicates adjustment in a Z-axial direction, a rotation direction (Xθ direction) about the X-axis, and a rotation direction (Yθ direction) about the Y-axial direction.

When conducting the focus adjustment as well as the alignment of the optical modulator 400G, the reinforcing member 937 follows the movement of the optical modulator 400G due to the surface tension of the ultraviolet curing adhesive applied among the respective components.

Next, after the position of the optical modulator 400G is adjusted in step S5, ultraviolet rays are irradiated on the ultraviolet curing adhesive applied among the optical modulator 400G, the reinforcing member 937 and the heat conductive member 940 at the same time to fix the respective components (step S6).

Then, step S5 and step S6 are processed on the optical modulators 400R and 400B referring to the optical modulator 400G, the position of which has been adjusted and fixed, so that the positions of the optical modulators 400R and 400B are adjusted and fixed (step S7).

According to the above described steps of procedures, the optical device body 700A is manufactured.

Incidentally, the optical device body 700A may not be assembled according to the order described above.

[1-4. Advantages of First Embodiment]

Following advantages can be obtained according to the above-described first embodiment.

(1) The supporting surfaces 940C1 for supporting the six reinforcing members 937 are formed on the heat conductive member 940 constituting the base 970, the six reinforcing members 937 being supported by the supporting surfaces 940C1 and also supporting and fixing the respective lateral end surfaces of the optical modulators 400R, 400G and 400B. Accordingly, the connecting state between the optical modulators 400R, 400G and 400B and the cross dichroic prism 500 can be strengthened with the use of the insulating pins 938. Even when an external force is applied against the optical device body 700A, displacement of the optical modulators 400R, 400G and 400B relative to the cross dichroic prism 500 can be inhibited, thus precisely maintaining the positions of the optical modulators 400R, 400G and 400B with each other so as to form a fine optical image without pixel deviation.

(2) Since the supporting surfaces 940C1 are formed on the heat conductive member 940 constituting the base 970, the supporting and fixing state of the respective lateral end surfaces of the optical modulators 400R, 400G and 400B can firmly be maintained with the use of the reinforcing members 937. Accordingly, even when the optical device body 700A is used for a long period, the supporting and fixing state of the respective lateral end surfaces of the optical modulators 400R, 400G and 400B can be remained fine state.

(3) The heat conductive member 940 includes the frame 940A and the legs 940B1 and 940B2, the legs 940B1 and 940B2 being provided with the columns 940C. The step is formed at the end of the column 940C to define the supporting surface 940C1 for supporting the reinforcing member 937. With this arrangement, the reinforcing members 937 are supported by the supporting surfaces 940C1 of the columns 940C, and also support and fix the lateral end surfaces of the optical modulators 400R, 400G and 400B, so that the reinforcing members 937 are fixed on the stepped lateral surfaces of the columns 940C. Accordingly, the supporting and fixing state of the respective lateral end surfaces of the optical modulators 400R, 400G and 400B can further be enhanced with the use of the reinforcing members 937.

(4) Since the supporting surface 940C1 is widened toward the light-incident side, and the reinforcing member 937 is formed by the columnar component having the substantially right triangle cross section, the reinforcing members 937 can easily be placed between the column 940C and the lateral end surface of the panel holder frame 902 from the light-incident side, thereby easily manufacturing the optical device body 700A.

(5) The ultraviolet curing adhesive is applied between the end of the column of the reinforcing member 937 and the supporting surface 940C1, between the lateral surface including hypotenuse constituting the substantially right triangle cross section and the lateral surface of the column 940C, and between the lateral surface including the another side constituting the substantially right triangle cross section and the lateral end surface of the panel holder frame 902. In the state that the adhesive is uncured, each position of the optical modulators 400R, 400G and 400B is adjusted. Accordingly, the reinforcing members 937 follow the movement of the optical modulators 400R, 400G and 400B due to the surface tension of the adhesive, and ultraviolet rays are irradiated on the adhesive after the positions of the optical modulators 400R, 400G and 400B are adjusted, so that the optical modulators 400R, 400G and 400B can easily and swiftly be positioned and fixed.

(6) Since the panel holder frame 902, the reinforcing member 937 and the heat conductive member 940 are made of heat conductive material such as aluminum, and these components are bonded and fixed with each other by the ultraviolet curing adhesive having heat conductivity, rigidity of the optical device body 700A as well as heat conductivity among the respective components can be enhanced, the heat generated at the optical modulators 400R, 400G and 400B due to irradiation of the light beam is radiated via a heat-transmission path which is defined from the panel holder frame 902 to the reinforcing member 937 then to the heat conductive member 940, thus avoiding heat deterioration on the optical modulators 400R, 400G and 400B.

(7) Since the panel holder frame 902, the reinforcing member 937 and the heat conductive member 940 are made of the same material such as aluminum, coefficient of thermal expansion will be approximately the same, so that heat stress generated at the respective components can be reduced and connecting state among the respective components can firmly be maintained.

(8) Since the projector 1 includes the optical device body 700A in which the rigidity thereof is enhanced and the cooling efficiency of the optical modulators 400R, 400G and 400B are enhanced, the projection optical system 600 can constantly project a vivid image.

2. Second Embodiment

Next, a second embodiment of the present invention will be described below.

In the following description, the same reference numerals will be attached to the similar structure and the same components as that of the first embodiment to omit the detailed description thereof.

In the first embodiment, the six reinforcing members 937 are configured by the triangular spacers, which are supported by the columns 940C formed on the heat conductive member 940, and besides support and fix the lateral end surfaces of the panel holder frames 902.

In contrast, according to the second embodiment, the columns 940C are not provided on a heat conductive member 940'. Further, reinforcing members 937' are formed by four trapezoidal spacers each having a substantially trapezoidal cross section, the reinforcing members 937' being supported by the heat conductive member 940' and also supporting and fixing the lateral end surfaces of the panel holder frames 902. At this time, the reinforcing member 937' disposed between the adjacent panel holder frames 902 supports and fixes the adjacent panel holder frames 902 with each other.

[2-1. Configuration of Heat Conductive Member and Reinforcing Member]

Figure 8:
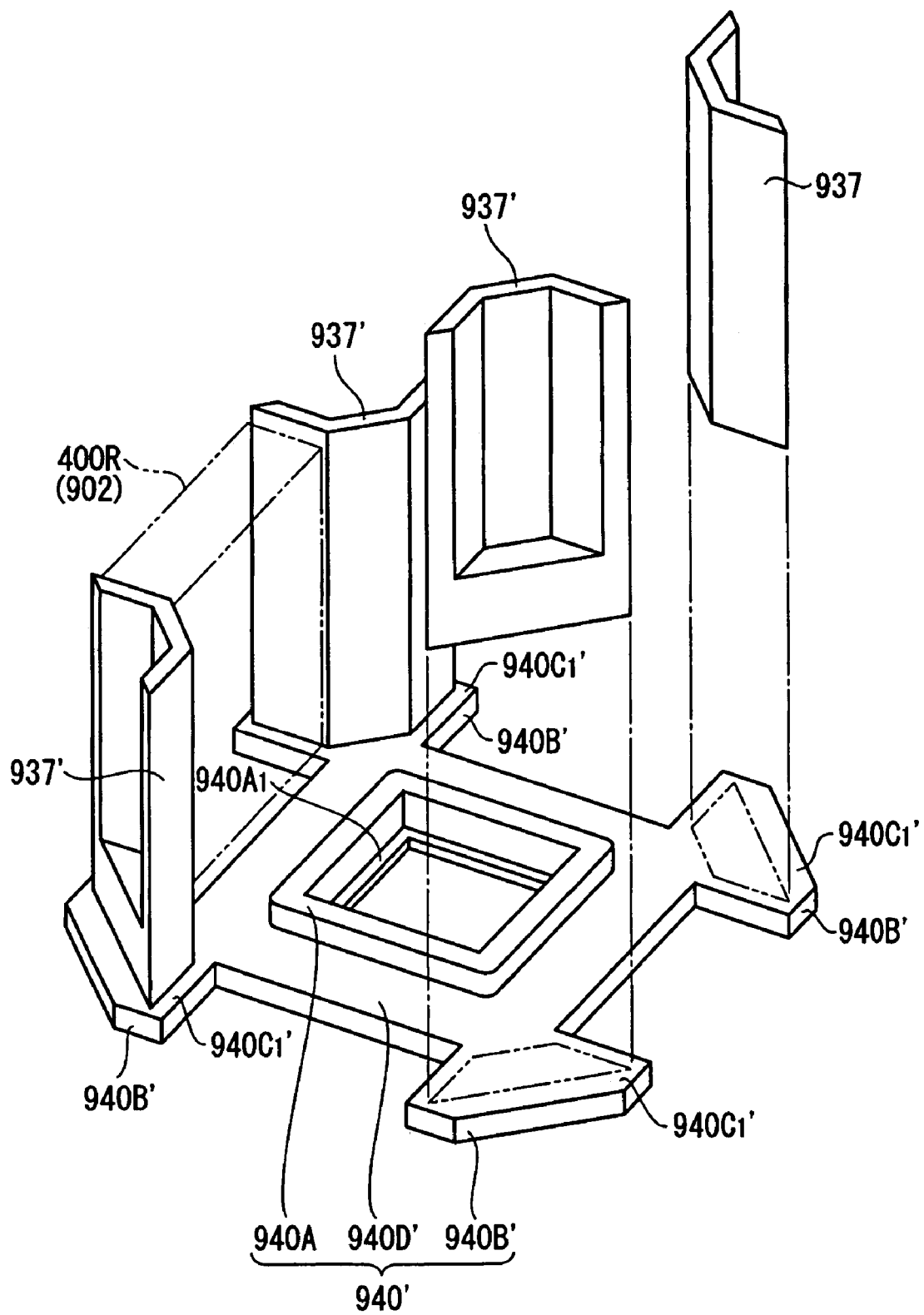
FIG. 8 is an exploded perspective view showing the structure of a heat conductive member and reinforcing members as well as an arranging state of these with a panel holder frame according to a second embodiment.

FIG. 8 is an exploded perspective view showing a structure of the heat conductive member 940' and the reinforcing members 937' as well as an arranging state of these with the panel holder frame 902 according to the second embodiment. It is to be noted that, to simplify the description referring to FIG. 8, only the panel holder frame 902 on the green light-incident side is shown out of the three panel holder frames 902, and the panel holder frames 902 on the red and blue light-incident sides are omitted.

The heat conductive member 940' is made of the same material as the heat conductive member 940 according to the first embodiment, the heat conductive member 940' including the frame 940A having the stepped surface 940A1 for mounting and fixing the prism fixing plate 950, a linking portion 940D' linking to the frame 940A and four legs 940B'. Note that, the frame 940A and the linking portion 940D' correspond to a plate component of the present invention.

The linking portion 940D', which is a substantially rectangular plate linking to the external lateral surface of the frame 940A, has the thickness smaller than that of the frame 940A.

The legs 940B extend outward along the linking portion 940D' from four corners thereof, each of the legs 940B' having a substantially trapezoidal profile in plane view. An upper surface of the leg 940B' defines a supporting surface 940C1' for supporting and fixing the reinforcing member 937'.

The reinforcing member 937' is made of the same material as the reinforcing member 937 of the first embodiment, which is a trapezoidal spacer having a substantially trapezoidal cross section, the inside of the reinforcing member 937' being hollowed out from an end thereof to a part near the other end. The other end of the reinforcing member 937' is supported by the supporting surface 940C1' of the leg 940B' of the heat conductive member 940', and besides, at least one of two lateral surfaces, which respectively include two sides not being parallel to each other constituting the trapezoidal cross section, faces to the lateral end surface of the panel holder frame 902. In other words, according to the reinforcing member 937' disposed between the two adjacent panel holder frames 902, the two lateral surfaces respectively including the two sides not being parallel to each other constituting the trapezoidal cross section, respectively face to the lateral end surfaces of the two adjacent panel holder frames 902. The ultraviolet curing adhesive having heat conductivity is applied among the reinforcing member 937', the supporting surface 940C1' of the leg 940B' and the lateral end surface of the panel holder frame 902, so that the lateral end surface of the panel holder frame 902 is heat-conductively fixed to the heat conductive member 940' by the reinforcing member 937', and the adjacent panel holder frames 902 can heat-conductively be fixed with each other by the reinforcing member 937'.

Incidentally, a manufacturing method of the optical device body 700A according to the second embodiment will not be described herein, because it can be manufactured in the substantially same manner as the first embodiment.

[2-2. Advantage of Second Embodiment]

According to the above-described second embodiment, following advantages can be obtained in addition to the substantially same advantages as (1), (2), and (5) to (8).

(9) The upper surface of the leg 940B' of the heat conductive member 940' defines the supporting surface 940C1' of the reinforcing member 937', so that the end of the columnar component of the reinforcing member 937' is supported by the supporting surface 940C1', and at least one of the external lateral surfaces respectively including the two facing sides not being parallel to each other constituting the substantially trapezoidal cross section supports and fixes each of the lateral end surfaces of the optical modulators 400R, 400G and 400B. Owing to this, according to the reinforcing member 937' disposed between the adjacent panel holder frames 902, the two lateral surfaces respectively including the two sides not being parallel to each other constituting the trapezoidal cross section support and fix the lateral end surfaces of the two adjacent panel holder frames 902 with each other. Therefore, the connecting state of the optical modulators 400R, 400G and 400B relative to the cross dichroic prism 500 can be strengthened by the four reinforcing members 937', the number of which is the least.

(10) The reinforcing member 937' is configured by the columnar component having a substantially trapezoidal cross section, the inside of the reinforcing member 937' being hollowed out from the end thereof to a part near the other end. Accordingly, the connecting state of the optical modulators 400R, 400G and 400B relative to the cross dichroic prism 500 can be strengthened as well as the weight of the reinforcing member 937' may be lightened, and consequently, the weight of the optical device body 700A can be lightened.

3. Third Embodiment

Next, a third embodiment of the present invention will be described below.

In the following description, the same reference numerals will be attached to the similar structure and the same components as that of the first embodiment to omit the detailed description thereof.

In the first embodiment, the six reinforcing members 937 are configured by the triangle spacers, which are supported by the columns 940C formed at the heat conductive member 940, and also support and fix the lateral end surfaces of the panel holder frames 902.

In contrast, according to the second embodiment (Translator's Comment: correctly, the third embodiment), the columns 940C are not provided at a heat conductive member 940". Further, a reinforcing member 937" is formed by rectangular plate processed by sheet metal processing, the reinforcing member 937" being supported by the heat conductive member 940" and also supporting and fixing the lateral end surface of the panel holder frame 902. At this time, the reinforcing member 937" disposed between the adjacent panel holder frames 902 supports and fixes the adjacent panel holder frames 902 with each other.

[3-1. Configuration of Heat Conductive Member and Reinforcing Member]

Figure 9:
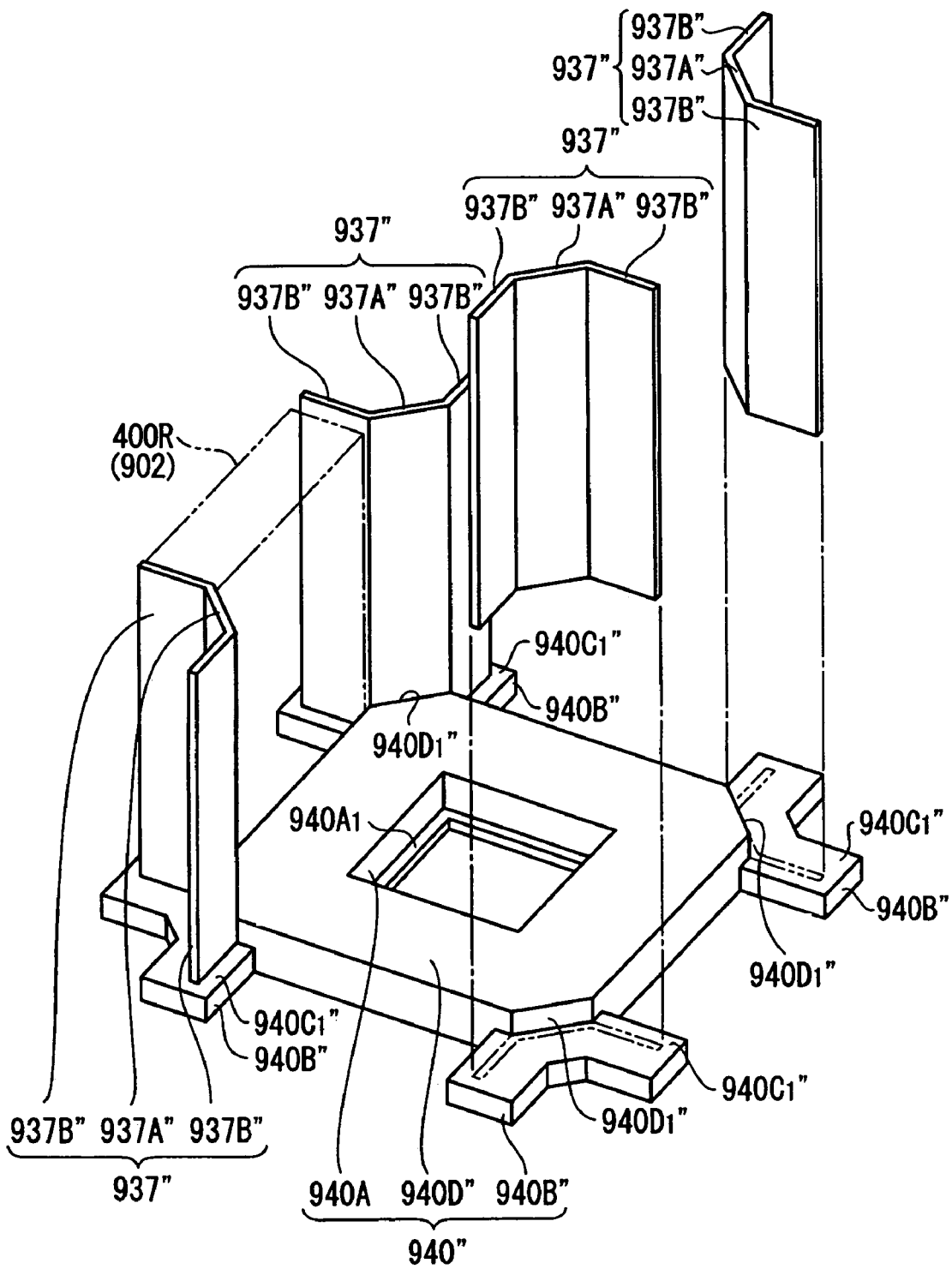
FIG. 9 is an exploded perspective view showing the structure of a heat conductive member and reinforcing members as well as an arranging state of these with a panel holder frame according to a third embodiment.

FIG. 9 is an exploded perspective view showing a structure of the heat conductive member 940" and the reinforcing members 937" as well as an arranging state of these with the panel holder frame 902 according to the third embodiment. It is to be noted that, to simplify the description referring to FIG. 9, only the panel holder frame 902 on the green light-incident side is shown out of the three panel holder frames 902, and the panel holder frames 902 on the red and blue light-incident sides are omitted.

The heat conductive member 940" is made of the same material as the heat conductive member 940 according to the first embodiment, the heat conductive member 940' including the frame 940A having the stepped surface 940A1 for mounting and fixing the prism fixing plate 950, a linking portion 940D" linking to the frame 940A and four legs 940B". Note that, the frame 940A and the linking portion 940D" correspond to a plate component of the present invention.

The linking portion 940D" is a substantially rectangular plate continuously formed with the frame 940A on the same plane with corners thereof being chamfered.

The legs 940B extend outward along a lower surface of the linking portion 940D" from four corners of the linking portion 940D", and has substantially an L-shape in plane view. Further, the thickness of the leg 940B" is smaller than that of the linking portion 940D", i.e., the linking portion 940D" has a stepped portion 940D1" at a part connecting with the leg portion 940B". An upper surface of the leg 940B" defines a supporting surface 940C1" for supporting and fixing the reinforcing member 937".

The reinforcing member 937" is formed of an aluminum rectangular plate by bending, edges facing to each other being bent in the same direction so as to form a gutter-like profile, which includes a base portion 937A" located substantially at the center and two extended portions 937B" extending from the base portion 937A" to have a truncated chevron cross section. The reinforcing member 937" is supported by the supporting surface 940C1" of the leg 940B" of the heat conductive member 940", a lower side of the base section 937A" facing to the stepped portion 940D1" of the linking portion 940D", and also at least one of the two extended portions 937B" facing to the lateral end surface of the panel holder frame 902. In other words, the reinforcing member 937" disposed between the two adjacent panel holder frames 902 faces to the respective edges of the two adjacent C-shaped panel holder frames 902.

The ultraviolet curing adhesive having heat conductivity is applied among the reinforcing member 937", the supporting surface 940C1" of the leg 940B", the stepped portion 940D1" of the linking portion 940D", and the panel holder frame 902, so that the lateral end surface of the panel holder frame 902 is heat-conductively fixed to the heat conductive member 940" by the reinforcing member 937", and the adjacent panel holder frames 902 can heat-conductively be fixed with each other by the reinforcing member 937".

Incidentally, a manufacturing method of the optical device body 700A according to the third embodiment will not be described herein, because it can be manufactured in the substantially same manner as the first embodiment.

[3-2. Advantages of Third Embodiments]

According to the above-described third embodiment, following advantages can be obtained in addition to the substantially same advantages as (1), (2), and (5) to (9).

(11) Since the reinforcing member 937" can be formed with the use of a rectangular plate made of aluminum or the like by bending, the reinforcing member 937" can easily be manufactured, and consequently, the production cost of the optical device 700 can be reduced.

(12) The linking portion 940D" of the heat conductive member 940" has the stepped portion 940D1", the lower side of the base portion 937A" of the reinforcing member 937" being fixed to the stepped portion 940D1". Accordingly, the supporting state of the reinforcing member 937" can be ensured relative to the heat conductive member 940", thus further strengthening the connecting state of the optical modulators 400R, 400G and 400B relative to the cross dichroic prism 500 with the use of the reinforcing member 937".

[4. Modifications of Embodiments]

While the present invention has been described above referring to the preferable embodiments, the present invention is not limited to the above-described embodiments, but includes improvements and modifications as long as an object of the present invention can be achieved.

In the respective embodiments, though the heat conductive members 940, 940', 940" and the reinforcing members 937, 937', 937" connect the optical modulators 400R, 400G, 400B with the cross dichroic prism 500 with the insulating pins 938 (fixing members) being interposed, other fixing members may be used to connect the optical modulators 400R, 400G, 400B with the cross dichroic prism 500.

In the respective embodiments, the optical modulators 400R, 400G, 400B are fixed on the light-incident surfaces of the heat conducting plates 935 by the insulating pins 938 relative to the cross dichroic prism 500, it is not limited thereto. For example, the heat conducting plates 935 may not be provided, so that the optical modulators 400R, 400G, 400B are respectively fixed to the light-incident surfaces of the cross dichroic prism 500 with the fixing members such as the insulating pins 938 being interposed.

In the respective embodiments, though the bases 970 are fixed on the upper and lower surfaces of the cross dichroic prism 500, the base 970 is only required to be fixed at either the upper or lower surface. Further, though it is described that the heat conductive members 940, 940', 940" are provided independently from the prism fixing plate 950, the heat conductive member may be one block shared by the prism fixing plate. With such configuration, the number of components for the optical device can be reduced, thus simplifying the structure of the device as well as the assembly of the device.

In the respective embodiments, though the ultraviolet curing adhesive is used as the optical device body 700A is manufactured, a heat curing adhesive or an adhesive curing at ordinary temperatures may alternatively be used.

Though a projector using three optical modulators are taken as an example in the above embodiment, the present invention may be applied to a projector using two optical modulators or more than three optical modulators.

Though a transmissive optical modulator having different light-incident side and light-irradiation side is used in the above embodiments, a reflective optical modulator having common light-incident side and light-irradiation side may be used.

Though a front-type projector that projects an image in a direction for observing a screen is taken as an example in the above embodiments, the present invention may be applied to a rear-type projector that projects an image in a direction opposite to the direction for observing the screen.

Although the best configuration for implementing the present invention has been disclosed above, the present invention is not limited to the best configuration. In other words, the present invention is mainly illustrated and described on the specific embodiment, however, a person skilled in the art can modify the specific configuration such as shape, material, quantity on the above-described embodiment as long as a technical idea and an object of the present invention can be achieved.

Therefore, the description that limits the shape and the material is only the example to make the present invention easily understood, but does not intend to limit the present invention, so that the present invention includes the description using a name of component without a part of or all of the limitation on the shape and the material etc.

INDUSTRIAL APPLICABILITY

Since the connecting state of the optical modulators relative to the color-combining optical device can be strengthened, and a fine optical image can be formed without pixel deviation, the optical device according to the present invention is useful as an optical device constituting a projector applied to the field of a presentation, home theater or the like.

The invention claimed is:

1. An optical modulator, comprising:
   a plurality of optical modulators that respectively modulate a plurality of color lights in accordance with image information;
   a color-combining optical device that combines and irradiates the respective color lights modulated by the optical modulators;
   a plurality of fixing members that respectively fix the plurality of optical modulators relative to respective light-incident surfaces of the color-combining optical device;
   a base fixed on at least one of a pair of end surfaces crossing to the respective light-incident surfaces of the color-combining optical device; and
   a plurality of reinforcing members disposed on lateral end surfaces of the plurality of optical modulators in a facing manner,
   wherein supporting surfaces that support the plurality of reinforcing members are formed on the base, and
   wherein the plurality of reinforcing members are supported by the supporting surfaces, and also support and fix the respective lateral end surfaces of the plurality of optical modulators, so that fixing state of the plurality of optical modulators is enhanced relative to the respective light-incident surfaces of the color-combining optical device.

2. The optical device according to claim 1,
   wherein the base includes a plate component rectangular in plan view and legs extending from four corners of the plate component to be parallel to a plate surface of the plate component,
   wherein a column projecting in an out-plane direction of the leg is provided on each of the legs, and
   wherein an end of the column has a step to have the supporting surface for supporting the reinforcing member.

3. The optical device according to claim 2,
   wherein the supporting surface is widened toward a light-incident side, and
   wherein the reinforcing member is formed in a substantially triangle pole, an end of the pole being supported by the supporting surface, and one of three external lateral surfaces of the substantially triangle pole supporting and fixing the lateral end surface of the optical modulator while another external lateral surface abutting on the column.

4. The optical device according to claim 1,
   wherein the base includes a plate component rectangular in plan view, and legs extending from four corners of the plate component to be parallel to a plate surface of the plate component and having the supporting surfaces that support the reinforcing members, and
   wherein the reinforcing member is configured by a columnar component having a substantially trapezoidal cross section, an end of the columnar component being supported by the supporting surface, and at least one of external lateral surfaces thereof, which respectively include two sides facing but not being parallel to each other constituting the trapezoidal cross section, supporting and fixing the lateral end surface of the optical modulator.

5. The optical device according to claim 4,
   wherein the plate component has the thickness greater than that of the leg to form a stepped portion at a part connecting with the leg, and
   wherein an external lateral surface of the reinforcing member including a short side out of two sides being parallel to each other constituting the substantially trapezoidal cross section or the base portion thereof abuts on the stepped portion.

6. The optical device according to claim 1,
   wherein the base includes a plate component rectangular in plan view and legs extending from four corners of the plate component to be parallel to a plate surface of the plate component and having the supporting surfaces that support the reinforcing members, and wherein the reinforcing member configured by a rectangular plate component with facing edges being processed by bending includes a base portion substantially located at the center and two extended portions extending from the base portion so as to have a truncated chevron cross section, an end of the reinforcing member crossing to the facing edges being supported by the supporting surface, and at least one of the two extended portions thereof supporting and fixing the lateral end surface of the optical modulator.

7. The optical device according to claim 1, wherein the optical modulator includes an optical modulation element for modulating a light and a holder frame in which the optical modulation element is housed, and wherein the holder frame, the reinforcing member and the base are made of heat conductive material, the respective components being bonded and fixed to each other by a heat conductive adhesive.

8. A projector, comprising:

a light source;

a color-separating optical device that separates a light beam irradiated by the light source into a plurality of color lights;

the optical device according to claim 1; and a projection optical device that projects an optical image formed by the optical device in an enlarged manner.

9. The projector according to claim 8, wherein the base includes a plate component rectangular in plan view and legs extending from four corners of the plate component to be parallel to a plate surface of the plate component, wherein a column projecting in an out-plane direction of the leg is provided on each of the legs, and wherein an end of the column has a step to have the supporting surface for supporting the reinforcing member.

10. The projector according to claim 9, wherein the supporting surface is widened toward a light-incident side, and wherein the reinforcing member is formed in a substantially triangle pole, an end of the pole being supported by the supporting surface, and one of three external lateral surfaces of the substantially triangle pole supporting and fixing the lateral end surface of the optical modulator while another external lateral surface abutting on the column.

11. The projector according to claim 8, wherein the base includes a plate component rectangular in plan view and legs extending from four corners of the plate component to be parallel to a plate surface of the plate component and having the supporting surfaces that support the reinforcing members, and wherein the reinforcing member is configured by a columnar component having a substantially trapezoidal cross section, an end of the columnar component being supported by the supporting surface, and at least one of external lateral surfaces thereof, which respectively include two sides facing but not being parallel to each other constituting the trapezoidal cross section, supporting and fixing the lateral end surface of the optical modulator.

12. The projector according to claim 11, wherein the plate component has the thickness greater than that of the leg to form a stepped portion at a part connecting with the leg, and wherein an external lateral surface of the reinforcing member including a short side out of two sides being parallel to each other constituting the substantially trapezoidal cross section or the base portion thereof abuts on the stepped portion.

13. The projector according to claim 8, wherein the base includes a plate component rectangular in plan view and legs extending from four corners of the plate component to be parallel to a plate surface of the plate component and having the supporting surfaces that support the reinforcing members, and wherein the reinforcing member configured by a rectangular plate component with facing edges processed by bending includes a base portion substantially located at the center and two extended portions extending from the base portion so as to have a truncated chevron cross section, an end of the reinforcing member crossing to the facing edges being supported by the supporting surface, and at least one of the two extended portions supporting and fixing the lateral end surface of the optical modulator.

14. The projector according to claim 8, wherein the optical modulator includes an optical modulation element for modulating a light and a holder frame in which the optical modulation element is housed, and wherein the holder frame, the reinforcing member and the base are made of heat conductive material, the respective components being bonded and fixed to each other by a heat conductive adhesive.

* * * * *